United States Patent [19]
Dobner

[11] Patent Number: 4,712,890
[45] Date of Patent: Dec. 15, 1987

[54] APPARATUS FOR ADJUSTING PLAY IN A PRECISION OPTICAL INSTRUMENT

[75] Inventor: Michael H. Dobner, Webster, N.Y.

[73] Assignee: Bausch & Lomb Incorporated, Rochester, N.Y.

[21] Appl. No.: 650,928

[22] Filed: Sep. 14, 1984

[51] Int. Cl.$^4$ .................. G02B 21/26; F16C 29/00
[52] U.S. Cl. ................................. 350/530; 384/49
[58] Field of Search ............... 350/528–530; 308/6 R; 384/49, 57

[56] References Cited

U.S. PATENT DOCUMENTS

| 4,262,974 | 4/1981 | Tojo et al. | 308/6 R |
| 4,334,717 | 6/1982 | Polidor | 308/6 R |

FOREIGN PATENT DOCUMENTS

| 2916229 | 1/1980 | Fed. Rep. of Germany | 308/6 R |
| 168493 | 2/1965 | U.S.S.R. | 350/530 |

*Primary Examiner*—John K. Corbin
*Assistant Examiner*—Loha Ben
*Attorney, Agent, or Firm*—John S. Norton

[57] ABSTRACT

A support member for a precision optical instrument includes an integral bearing guide member for providing relatively friction-free movement to a movable member. The integral member 15 is pivoted with respect to the movable member to adjust the amount of play between the support member and the movable member.

8 Claims, 6 Drawing Figures

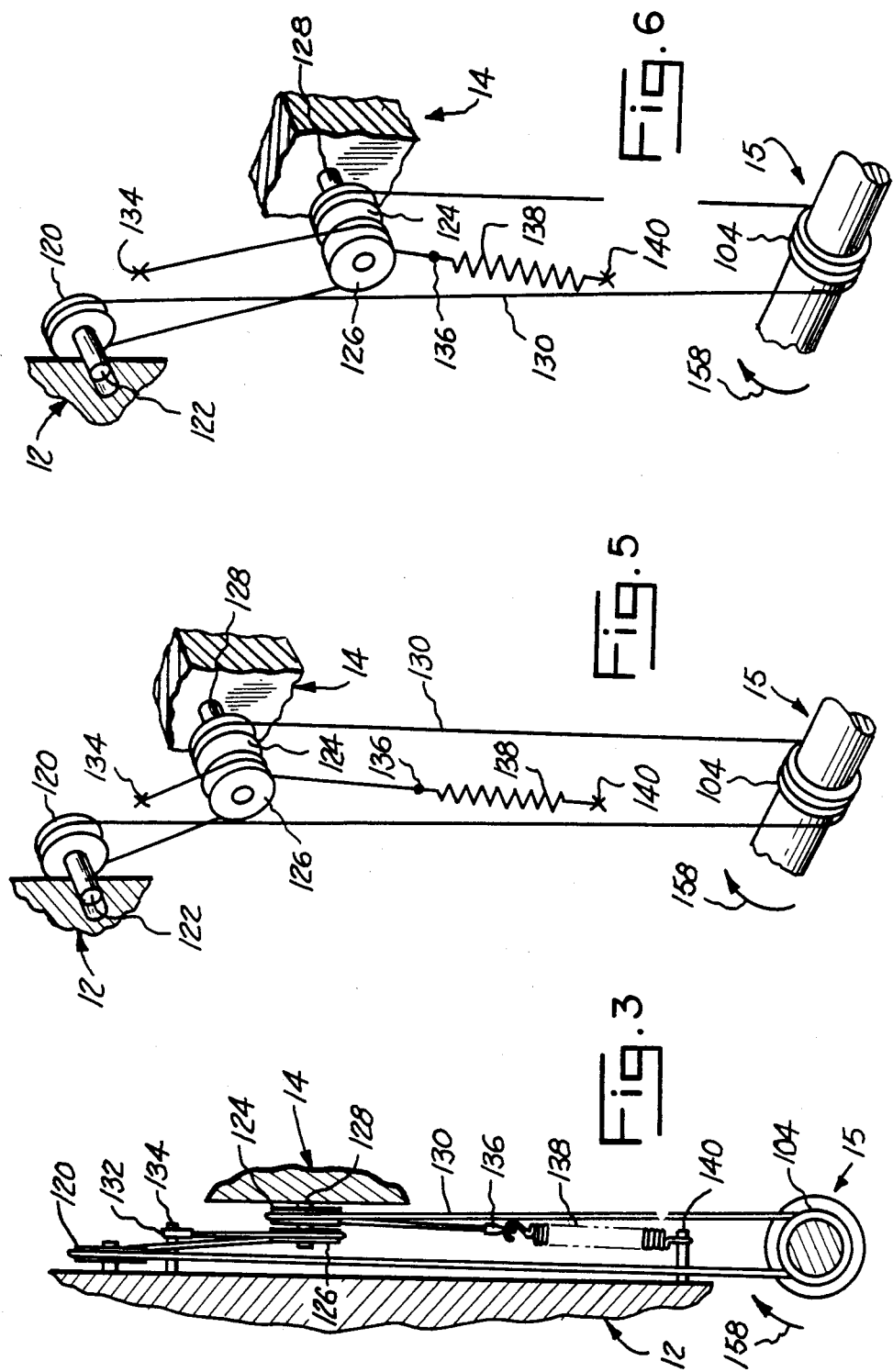

APPARATUS FOR ADJUSTING PLAY IN A PRECISION OPTICAL INSTRUMENT

CROSS-REFERENCE TO RELATED APPLICATIONS

The present application is related to U.S. Ser. No. 650,756 entitled "Cable Drive Focusing Mechanism for Optical Instruments" filed Sept. 14, 1984 for inventors James A. Clark and Michael Dobner and U.S. Ser. No. 650,927 entitled "Auxiliary Adjusting Mechanism for Optical Instruments", filed Sept. 14, 1984 for James A. Clark.

BACKGROUND OF THE INVENTION

1. Field of the Invention:

This invention relates to an adjusting mechanism for adjusting the amount of play between the relatively movable members of optical instruments, such as microscopes and particularly to an adjusting mechanism which alters the position of a portion of the support member with respect to the movable member to achieve the adjustment.

2. Description of the Prior Art

In the past, manufacturers of precision optical instruments, such as microscopes have commonly used dovetail slides or ball bearing slides to provide relative movement between two members, such as between the support column and the stage or head assembly. Generally speaking, one side of the dovetail or ball slide assembly is formed integrally with the support column while the other side is a separate assembly which is adjustably secured to the column by, for example, a plurality of screws. In order to adjust the amount of play between the movable and stationary parts all of the screws have to be loosened. The adjustable dovetail or ball slide has oversized apertures through which the screws are fixed so that when loosened the slide may be moved about by, for example, tapping with a hammer. Starting with one end, the slide is tapped and a screw adjusted until all of the screws are properly torqued and the appropriate amount of play is provided between the parts. However, this apparatus requires that a separate piece be machined for the requisite dovetail or ball slide which must be provided with oversized holes for the screws being utilized. Accordingly, systems such as these are somewhat expensive to manufacture and time consuming to assemble and to operate.

SUMMARY OF THE INVENTION

An adjusting mechanism for removing play between relatively movable members of precision optical instruments, such as microscopes, includes a member pivotally connected to the support column of the instrument. The pivotable member has a bearing slide surface which is engaged to a bearing member. The pivotable member may selectively be pivoted toward or away from the bearing member to alter the amount of play between the relatively movable parts.

BRIEF DESCRIPTION OF THE DRAWINGS

FIG. 3 is a partial section taken along line 3—3 of FIG. 1;

FIGS. 5 and 6 are schematic diagrams of the closed loop adjusting mechanism.

DETAILED DESCRIPTION OF THE PREFERRED EMBODIMENT

Figure 1:
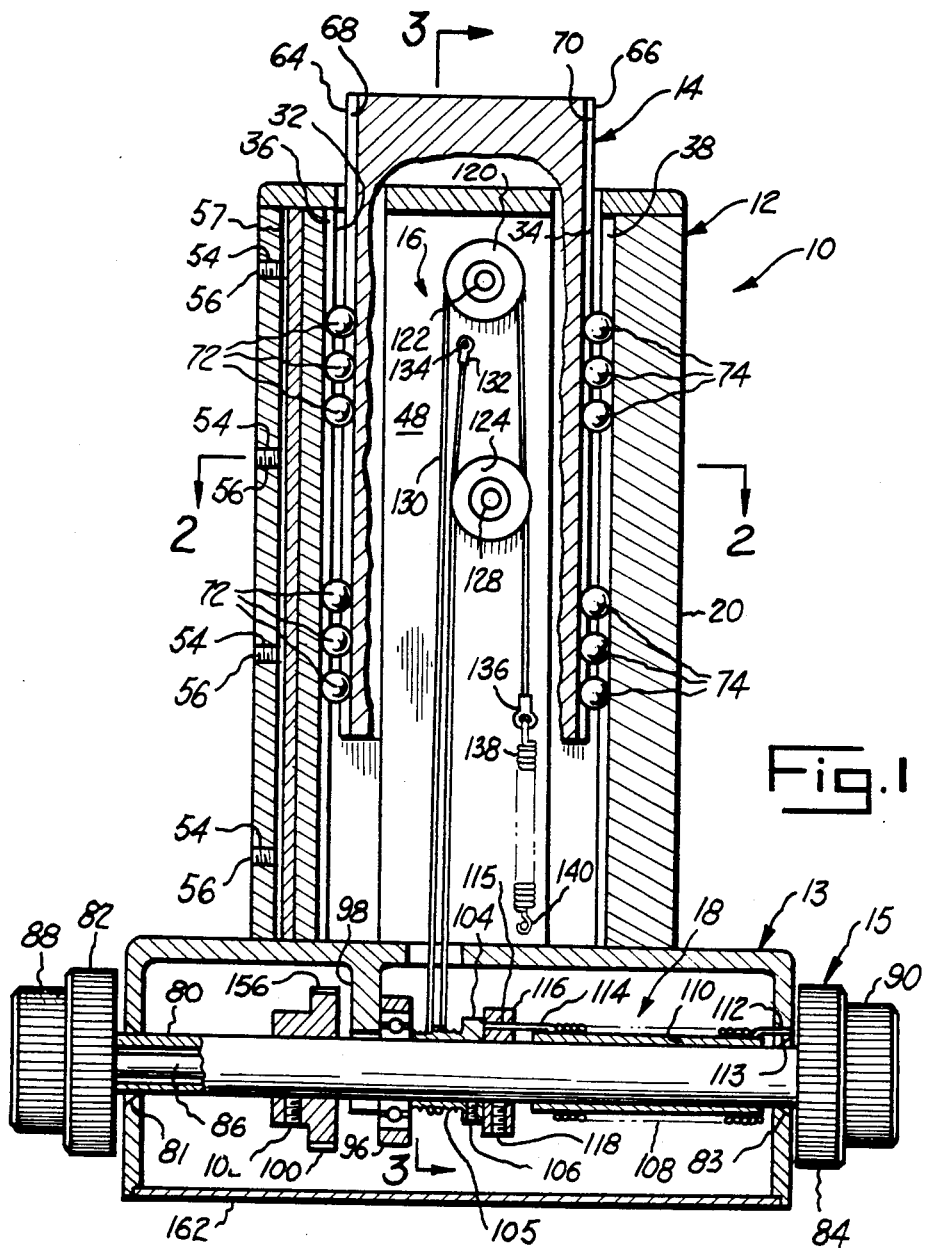
FIG. 1 is a partially sectioned front view of an optical instrument incorporating and adjusting mechanism of the present invention.

An optical instrument 10, such as a microscope, is shown in FIG. 1 and comprises a support column 12, a slide member 14 mounted to the column for low friction movement, a closed loop drive system 16 for moving the slide member 14 with respect to the column 12, and a spring biasing member 18 for applying torque to the drive system to offset the weight of the slidable member 14 and any devices mounted thereto, such as a microscope stage or head. The column 12 is fixed to base 13 which supports a coarse/fine adjusting mechanism 15 and an auxiliary adjusting mechanism 17.

Figure 2:
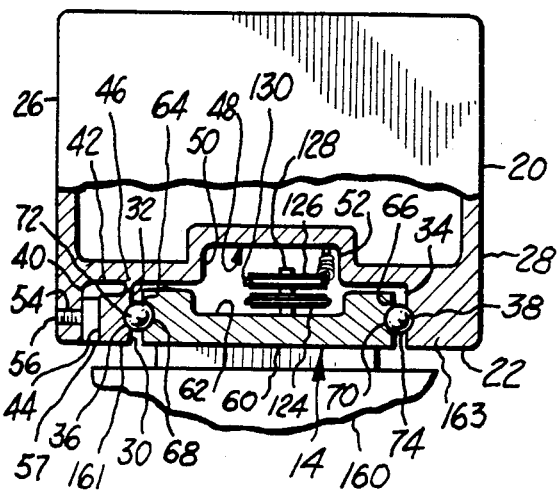
FIG. 2 is a sectional view taken along line 2—2 of FIG. 1.

As best seen in FIGS. 1 and 2, support column 12 comprises an elongated generally boxed shaped member 20, having front 22, rear 24 and side walls 26 and 28. Front wall 22 includes a vertical recess 30 which is defined by a pair of opposing sides 32 and 34. A ball race 36 is formed in side 32 while a corresponding ball race 38 is formed in side 34. Wall 22 includes a second vertical recess 48 having sides 50 and 52 which are substantially parallel to sides 32 and 34.

Front wall 22 includes an L-shaped slot 40 formed between wall 26 and side 32. As is best seen in FIG. 2, foot 42 of slot 40 extends from leg 44 toward side 32. A relatively thin section 46 of material remaining between foot 42, side 32 and hinged portion 161. A plurality of threaded apertures 54 are formed in side 26, as best seen in FIG. 1, and receive adjusting screws 56.

Slide member 14 comprises front 60, rear 62 and sides 64 and 66, respectively. A ball raceway 68 is formed in side 64. A complimenting ball raceway 70 is formed in side 66. The slide member 14 is mounted to column 12 via ball bearings, such as is illustrated by 72 and 74 in FIGS. 1 and 2.

By referring to FIG. 1, it will be seen that support column 12 is mounted in any appropriate way (not shown) to base 13 which contains the coarse and fine adjusting mechanism 15 such as disclosed and claimed in assignee's U.S. Ser. No. 450,901, filed Dec. 21, 1982 (now U.S. Pat. No. 4,437,448). Briefly, the mechanism 15 comprises a coarse focus shaft 80 which is rotatably mounted in base 13 by bearings 81, 83 and 96. A pair of adjusting knobs 82 and 84 are mounted at opposite ends of the coarse adjusting shaft. A fine adjusting shaft 86 is coaxially mounted within coarse shaft 80 and includes a pair of oppositely mounted adjusting knobs 88 and 90 respectively. The bearing member 96 is supported on boss 98. For purposes described later, shaft 80 also supports pulley 100, cable wrap reel 104 and spring biasing member 18. Pulley 100 is fixed via set screw 102 to shaft 80 between bearing 81 and boss 98. A cable wrap 104 is fixed to the coarse shaft 80, adjacent bearing 96, by set screw 106. The cable wrap reel includes a spiral groove 105.

The spring biasing member 18 comprises a torsion spring 108 which is fitted about a sleeve member 110 which is itself fixed over coarse shaft 80. As shown in FIG. 1, end 112 of torsion spring 108 is fixed to, for example, aperture 113 of base 13. The other end 114 is fixed to aperture 115 of collar 116 which, as explained below, is fixed via set screw 118 to coarse shaft 80 adjacent cable wrap reel 104.

As illustrated in FIGS. 1 and 3 and schematically in FIGS. 5 and 6, the closed loop drive system 16 includes a first pulley 120 rotatably mounted to shaft 122 which is received in recess 48 of column 12. Second and third pulleys 124 and 126 are rotatably supported by shaft 128 on side 62 of slide member 14. A non-elastic, flexible drive cable 130 couples the first, second and third pulleys together with the coarse/fine adjusting mechanism 15. One end 132 of the cable 130 is fixed to post 134 which, in turn, is fixed to and extends from column recess 48. As best seen in FIGS. 5 and 6, the cable 130 extends from post 134 down and approximately 180 degrees around slide member pulley 126 and back up around column pulley 120. Cable 130 wraps approximately 180° around pulley 120 extending down to engage and wrap several times around the spiral wrap reel 104 which, as mentioned previously, is mounted to coarse/fine adjusting mechanism 15. The cable 130 extends from wrap reel 104 upwardly to engage and wrap approximately 180° around pulley 124, and then down to where end 136 is fixed to coil spring 138. The spring 138 is in turn mounted to post 140 which is fixed to column 12 and provides a positive tensioning force to cable 130 ensuring that it remains taut.

Figure 4:
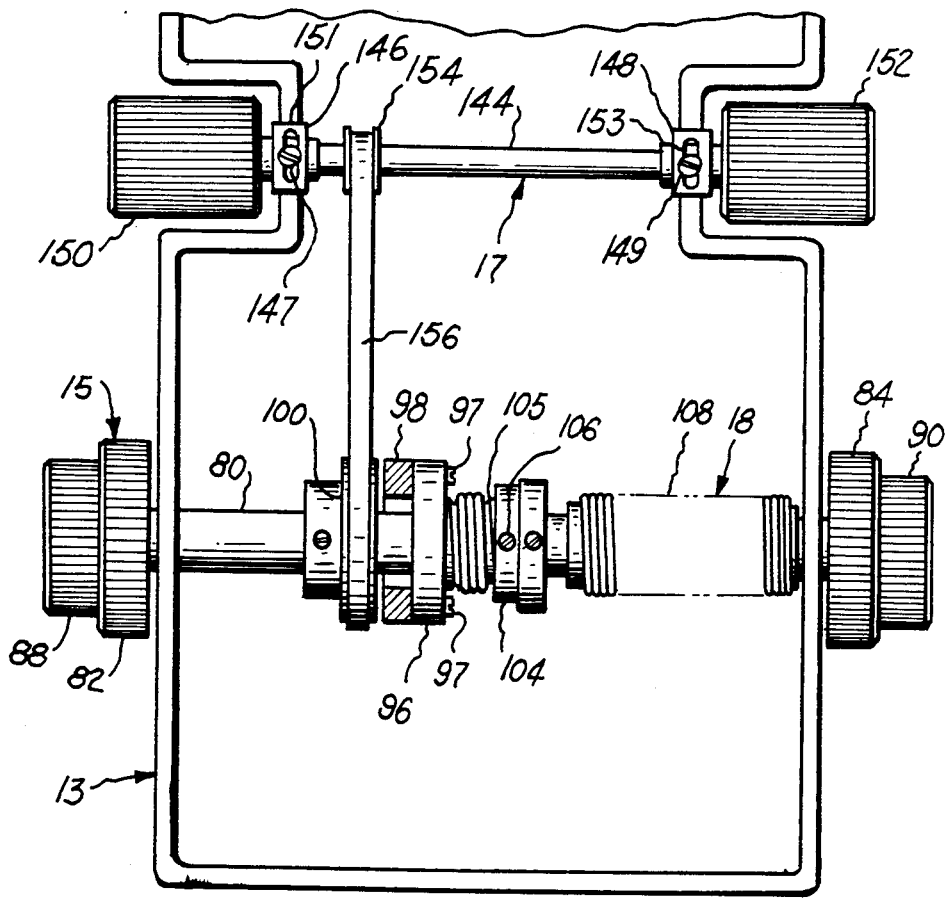
FIG. 4 is a bottom plan view of the instrument of FIG. 1 having the cover plate removed.

An auxiliary adjusting mechanism 17, best illustrated in FIG. 4, is mounted to base 13 adjacent coarse/fine adjusting mechanism 15. Mechanism 17 comprises shaft 144 which is rotatably mounted to base 13 by adjustable bearing and retainer assemblies 146 and 148. Suitable knobs 150 and 152 are mounted at opposite ends of shaft 144. A pulley 154 is mounted to shaft 144 so as to be in approximate alignment with pulley 100 mounted to coarse/fine adjusting mechanism 15. A pulley belt 156 couples pulleys 100 and 154 together. Belt 156 is preferably toothed as are pulleys 100 and 154.

In operation, the operator may grasp and rotate any appropriate adjusting knob (82, 84, 88 or 90) to rotate shaft 80 which in turn wraps cable 130 about cable wrap reel 104. However, it is evident from viewing the drawings and from the foregoing description, that cable 130 is fixed at end 132 and end 136, via spring 138, to support column 12 to form a closed loop. Therefore, since it is not possible to alter the length of cable 130, rotation of shaft 80 merely takes up a certain amount of cable 130 on one side of reel 104 and plays out the exact amount on the other side thereof. For instance, by viewing FIGS. 5 and 6, it will be seen that by rotating coarse/fine adjusting mechanism 15 in a clockwise direction, as indicated by arrow 158, cable 130 and pulleys 124 and 126 are pulled downward. Cable 130 is also pulled upward on the left hand side, over pulley 120, by the downward movement of pulley 126. Because the cable forms a closed loop system, as previously described, and because pulleys 124 and 126 are fixed to the slide member 14, rotation in a clockwise manner moves slide member 14 in a downward manner. Obviously, by rotating in a counter-clockwise manner the downward pull on the cable, between reel 104 and pulley 120 exerts an upward pull on pulley 126 and, hence, slide member 14.

Member 14 has been designed so that various assemblies may be selectively mounted or dismounted from it. For example, a stage 160, such as partially shown in FIG. 2, may be mounted to the slide member 14. Or, depending on the application, a head assembly containing appropriate optics may be mounted. In order to compensate for the differences in weight between the assemblies, a spring biasing member 18 is provided which allows for simple and easily accomplished adjustments. With this design, slide 14, and the assembly supported thereon, such as stage assembly 160, can be statically balanced at approximately midway in the travel of the slide member 14. This is accomplished by adjusting the torque applied to the adjusting mechanism 15 by the spring biasing member 18. By interchanging that stage assembly 160 for another which is perhaps heavier or lighter, it is preferable to rebalance the system. To accomplish this, an operator would gain access to the bottom of the instrument 10 through removable cover 162 of base 13 so that screw 106 of cable wrap reel 104 may be loosened. The operator would then hold wrap reel 104, now uncoupled from shaft 80, in a relatively fixed position with one hand while, with the other hand, rotating either of the coarse adjusting knobs 82, 84. Depending on the direction of rotation of shaft 80, spring 108 is either tightened or loosened. Therefore, by rotating shaft 80 in either direction, the torque which spring 108 exerts on shaft 80 is either increased or decreased a corresponding amount. Obviously, by increasing the weight supported by the slide member 14, it becomes necessary to increase the torque delivered by spring 108. The operator would, therefore, tighten the spring an appropriate amount. After adjusting the torque, set screw 106 could then be locked down on course shaft 80 to restore static balance to the system.

The auxiliary focusing mechanism 17 has been provided to afford the operator an alternative location for initiating focusing. As adjusting mechanism 15 is closer to the rear of the instrument 10 it is, for some people, awkward to reach. Mechanism 17 is positioned closer to the front of the instrument 10 and, thus, may be more convenient to grasp and rotate either knob 150 or 152. By rotating shaft 144, belt 156 is likewise rotated and, in turn, rotates pulley 100 and coarse/fine adjusting mechanism 15.

As the belt 156 is designed to be tautly positioned between pulley 100 and pulley 154, some distortion of the coarse/fine adjusting mechanism 15 may normally occur. However, bearing 96 which is journalled about coarse shaft 80 of mechanism 15 is provided to prevent such distortions. Once coarse/fine adjusting mechanism 15 has been preliminarily positioned in base 13, the bearing 96 is secured by screws 97 to boss 98, as best illustrated in FIG. 4. The auxiliary adjusting mechanism 17 is then positioned by loosening screws 147 and 149 which are fitted to slotted apertures 151 and 153 of bearing retainers 146 and 148 respectively. The auxiliary adjusting mechanism 17 is moved to tighten belt 156 on pulleys 100 and 154 thereby exterting the appropriate amount of tension. When mechanism 17 is properly positioned, screws 147 and 149 are locked down on bearing retainers 146 and 148.

By referring to FIG. 2, it will be seen that thin section 46 adjacent L-shaped slot 40 may be made to act similar to a hinge by manipulating adjusting screws 56. For instance, should there be too much play between slide member 14 and column 20, screws 56 would be tightened to bear against a member 57 situated in leg 44 of slot 40, which in turn bears against the hinged portion 161 of the column having ball raceway 36 formed therein. By tightening screws 56, thin section 46 is caused to flex thereby acting as a hinge pivoting portion 161 toward slide member 14. The opposite side of slide member 14 is rigidly supported by ball bearing 74 and a sturdy unflexible portion 163 of column 12. Accordingly, the fit between the ball raceways and the ball bearings may be adjusted to remove some or all of the play. Obviously, in order to increase the play in the system, it is necessary to loosen screws 56 to release some of the pressure which they exert against hinge portion 161 of column 12. The plate 57 is manufactured from an appropriate material to ensure that screws 56 exert a relatively uniform force against the hinged portion 161 of the column 12. Plate 57 also prevents the screws 56 from digging into and distorting the hinged portion 161 of the column 12.

It should be understood that although only a certain embodiment of this invention has been shown and described in detail that there are other embodiments and modifications which could be made to the present invention without departing from the spirit or scope of the invention as set forth and defined in the appended claims.

It is claimed:

1. In an optical instrument, such as a microscope, apparatus for adjusting play between a support column and a member such as a stage or optical head assembly mounted for linear movement with respect to said support column, comprising:
   (a) bearing means mounted between the support column and the linearly movable member; and
   (b) adjustment means for enabling the engagement between the support column, said bearing means and the linearly movable member to be altered, said adjustment means including:
      (i) a pivotable member coupled to the support column by a hinged section integrally formed therebetween, and
      (ii) means to pivot said pivotable member either toward or away from said linearly movable member to thereby adjust the play between said linearly movable member and said support column.

2. The apparatus as set forth in claim 1, wherein said hinged section is formed by a slot in the support column.

3. The apparatus as set forth in claim 2, wherein said slot is L-shaped.

4. The apparatus as set forth in either claim 2 or claim 3, wherein said pivot means comprises at least one member adjustably supported by said support column and engageable with said pivotable member to move said pivotable member relative to said support column.

5. The apparatus as set forth in claim 4 and further including means disposed in said slot for evenly distributing longitudinally the load imposed against said pivotable member by said at least one adjustable member.

6. An optical instrument, such as a microscope, having one member linearly movable relative to at least another movable member, apparatus for removing play therebetween, comprising:
   (a) a support column;
   (b) a first member pivotally secured to said support column by a hinged section formed therebetween;
   (c) a second member linearly movable relative to said support column and said first member; and
   (d) bearing means mounted between said support column and said second member and said first and second members for permitting low friction linear movement of said second member with respect to said support column and said first member, said first member being adjustably pivotable about said hinged section to provide adjustment to said second member relative to said support column and said first member along said bearing means to thereby increase or decrease the amount of play therebetween.

7. The apparatus as set forth in claim 6 wherein said support column and said first member include bearing races and said bearing means is mounted therebetween.

8. The apparatus as set forth in claim 7 wherein said bearing means comprises a plurality of ball bearings received by said bearing races.

* * * * *